April 9, 1940.   W. A. DVORAK   2,196,896
DENTAL MATRIX
Filed Oct. 24, 1936
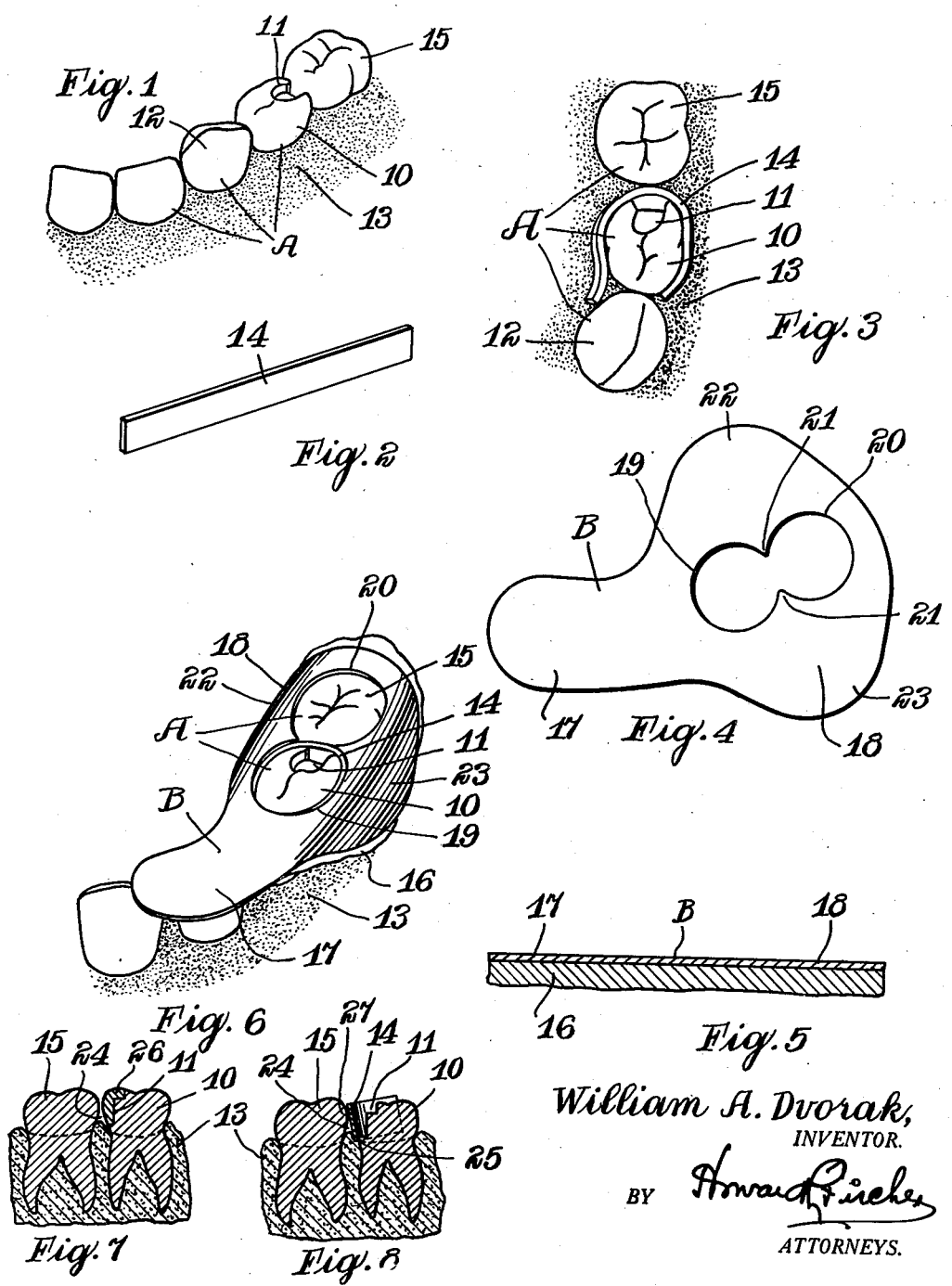
William A. Dvorak,
INVENTOR.
BY Howard Pincher
ATTORNEYS.

Patented Apr. 9, 1940

2,196,896

UNITED STATES PATENT OFFICE 2,196,896

DENTAL MATRIX

William A. Dvorak, St. Paul, Minn.

Application October 24, 1936, Serial No. 107,447

4 Claims. (Cl. 32—63)

My invention relates to a dental matrix, wherein it is desired to provide a simple method of making fillings, and an apparatus whereby said method may be readily carried out.

In the filling of cavities, and particularly proximal cavities, it is common practice to secure a matrix about the tooth to be filled, to support the filling material as it is put into place. This matrix is ordinarily in the form of a band of soft metal or the like, which may be adapted around the tooth, and clamped in a suitable manner by a band clamping means which engages both ends of the band and draws them together tightly about the tooth.

This common practice can be readily carried out where the teeth are spaced slightly apart, and where the teeth project far enough out of the gums. However, where the teeth are too close to permit a band to be extended entirely about the tooth, or where a bridge is attached to the tooth being filled and extends from the opposite proximal surface, a band of this type cannot be readily clamped. Also, where the teeth do not extend the usual distance out of the gums, as in deciduous or temporary teeth, it is very difficult to clamp a band to the proper contour of the tooth without extending the band below the surface of the gums, making the procedure extremely painful to the patient.

It is the purpose of the present invention to provide a means of retaining the matrix in place over the surface of a tooth without clamping the matrix about the tooth. Deciduous teeth may by this means be filled without the accompanying pain of clamping band tightly about the gums. Accordingly, one of the most painful operations found in the filling of teeth of this sort is eliminated.

It is a further object of my invention to provide a means of supporting a matrix extending over the surface such as the proximal surface of a tooth where it is not possible to adapt a band entirely about the tooth. By this means, teeth which are not properly spaced to permit the insertion of a matrix therebetween, or which are for any other reason attached to other teeth, may be readily provided with a matrix properly supported to support filling material during the filling of the tooth, or the taking of an impression of the cavity therein.

It is an object of my invention to provide a method of filling cavities on the proximal surface of a tooth by adapting a strip of soft or moldable material over the cavity surface of the tooth, and then placing over the tooth prepared in this way, a matrix holding plate lined with molding material or the like, pressing the holding plate into engagement with the inner and outer surface of the teeth to urge the molding material about the matrix. The molding material will set sufficiently to hold the matrix in position. The holding plate is provided with suitable openings above the tooth to be filled, so that the tooth may be filled through this plate, the matrix forming a retaining wall to support the filling material until properly set.

My invention also lies in the provision of a matrix holding plate being coated on its under surface with a plastic molding material which will hold the holding plate to the teeth and gums, and which will also hold the matrix in proper position. The plate is provided with means for providing access to the tooth to be filled, and is preferably formed with connecting openings for two adjacent teeth, to permit the holding plate to be urged more closely adjacent the gums.

These and other objects and novel features of my invention will be more clearly and fully set forth in the following specification and claims.

In the drawing forming a part of my specification:

Figure 1 illustrates in perspective a series of teeth, one of which is provided with a cavity therein to be filled.

Figure 2 illustrates the matrix which may be used with my method.

Figure 3 is a top plan view of a series of teeth, one of which is to be filled; and shows the matrix wrapped partially about the tooth to be filled, extending over the proximal surface adjacent the cavity.

Figure 4 is a top plan view of my matrix holding plate.

Figure 5 is a side elevation view of the matrix holding plate shown in Figure 4, having molding compound coated thereon.

Figure 6 is a perspective view of a series of teeth covered by my matrix holding plate, one tooth being in readiness for being filled.

Figure 7 is a cross-sectional view through a pair of adjacent teeth after a filling has been inserted.

Figure 8 illustrates in cross-section a pair of adjacent teeth, showing the position of the matrix before the cavity in one of the teeth is filled.

A series of teeth A are shown in Figure 1 of the drawing. One particular tooth, designated at 10, is to be filled, and the cavity is prepared in the usual manner, as indicated at 11. The cavity 11 is in one proximal surface of the tooth 10. The teeth A may be considered deciduous teeth. It will furthermore be noted, in the plan view of a portion of these teeth A in Figure 3 of the drawing, that the opposite proximal surface of the tooth 10 is closely adjacent the next tooth 12. The teeth 10 and 12 are, in fact, so close together that a matrix band could not well be inserted between these teeth to be clamped in position in the usual way well known to those who practice dentistry.

Accordingly, in place of extending a matrix entirely about the tooth 10, which does not project sufficiently far from the gums 13 to enable this matrix to be clamped without extending below the surface of the gums 13, I provide a matrix strip 14 formed of soft pliable material in preferred form. This strip 14 is extended over the proximal cavity 11, between the teeth 10 and 15, and over the lingual and the labial or buccal surface of the tooth 10 sufficiently to provide a retaining wall for a filling to be inserted into the cavity.

I then take a matrix holding plate B, shown in Figures 4, 5 and 6 of the drawing, and apply to the lower surface thereof a coating 16 of molding material of some sort which will set sufficiently to hold the plate B in position when applied. The holding plate B is provided with a handle portion 17, and an enlarged portion 18. In preferred form, openings 19 and 20, which usually interconnect as shown, are formed in the plate B, in the enlarged portion 18 thereof. The openings 19 and 20 are of approximately the proper size to fit over the crown of the teeth 10 and 15. The formation of the separate connecting openings 19 and 20 provides a pair of oppositely disposed ears 21 which fit somewhat between the adjacent teeth 10 and 15.

After the matrix strip 14 is in place, and the holding plate B is coated with molding material 16, the plate B is forced down over the teeth 10 and 15. The oppositely disposed ears 21 bear against the matrix 14, and urge it into contact with the proximal surface of the tooth 10; and being wedged between the tooth 15 and the matrix 14 holds the matrix firmly. The plate B is formed of soft, bendable or pliable material, and is ordinarily furnished when flat, as illustrated in Figures 4 and 5. When in proper position over the teeth, however, the side edges 22 and 23 extend down over the gums 13, the plate B being bent so that the molding material 16 thereon is pressed against the teeth and gums, and entirely around the outside of the matrix plate 14. The holding plate B is held in this position until the molding material thereupon has set. When set, this molding material clings to the teeth and holds the matrix 14 rigidly in position to form a retaining wall for the cavity 11. The cavity may then be filled in any desired way through the opening 19 in the plate B.

The handle portion 17 of the plate B overlies the occlusal surfaces of the adjacent teeth A, and forms a means for holding the plate B if additional support is needed. The dentist, or the patient, can hold this handle portion 17 against the teeth A, preventing displacement of the holding plate B and accordingly the matrix 14. When the cavity has been filled, the molding material 16 may be broken away by bending up the sides 22 and 23 of the enlarged portion 18 of the plate B. A material is used for the coating 16 which will be easily removed when desired.

A cross-section through the teeth 10 and 15 is shown in Figures 7 and 8 of the drawing. It is important and necessary to restore with a filling the normal contour of the broken down portion of the tooth and to retain a tight contact between the two teeth. The manner in which it may be accomplished may be seen in Figure 8 of the drawing. The holding plate B, when formed about the contour of the teeth, forces molding compound into the space 24 between the matrix strip 14 and the tooth 15, urging the lower extremity of this strip 14 into close contact with the tooth 10 immediately below the cavity 11, at the point 25 in Figure 8. A tight contact between the new filling 26 and the tooth 15 is insured by pressing the matrix strip 14 against the adjacent tooth 15 at the point of contact 27. As this strip 14 is extremely thin, a very close contact is insured between the filled tooth 10 and the adjacent tooth 15.

The dentist, to follow this method, needs only the matrix strip 14 preferably of pliable material, and the matrix holding plate B also formed of pliable material. The molding compound may be of a type commonly used for different purposes.

The holding plates B are preferably purchased preformed. The openings 19 and 20 may be enlarged or shaped to fit closely over the teeth 10 and 15. This trimming of the plate B may be easily accomplished by resting the flat plate over the teeth 10 and 15, and noting where the openings 19 and 20 may be enlarged to fit over the teeth. Various sizes of openings 19 and 20 may be provided for use on various teeth; and the plate may be simply inverted for use on teeth on the opposite side of the mouth from the teeth A shown in the drawing. If desired, a single opening 19 may be provided through the plate B. However, it is usually preferable to form the openings as shown so that the ears 21 may bear against the outer surface of the matrix 14.

Although I have illustrated a preferred embodiment of my invention, and described a particular method of using the same, it will be readily understood that various changes coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. In combination with a matrix adapted to extend over a surface of a tooth, a matrix holding plate having an opening therein, said plate adapted to extend over said tooth and to overlie the matrix, said opening therein providing access to said tooth for filling the same, and a coating of molding material on said matrix holding plate engageable with the outer surface of said matrix to mold said matrix firmly in position against said tooth.

2. In combination with a matrix adapted to extend over a surface of a tooth; a matrix holding plate formed of pliable material adapted to overlie the occlusal surfaces of teeth adjacent said tooth, and having an opening therethrough to accommodate said tooth, the edges of said opening engaging against the outer surface of said matrix to hold the same against said tooth.

3. In combination with a matrix adapted to extend over a surface of a tooth, a matrix holding plate formed of pliable material adapted to overlie the tooth and matrix; said plate having a pair of interconnecting openings therein to extend over a pair of adjacent teeth, and ears formed between said openings adapted to extend into contact with the outer surface of said matrix to hold said matrix in position.

4. In combination with a matrix adapted to extend over a surface of a tooth; a matrix holding plate adapted to overlie the occlusal surfaces of adjacent teeth and comprising a plate of pliable material having an opening therein adapted to extend over the tooth and over the matrix, the edges of the opening engaging against the matrix to hold the same in place, and means for holding said matrix holding plate in position.

WILLIAM A. DVORAK.